United States Patent
Llamas et al.

(10) Patent No.: US 9,174,153 B2
(45) Date of Patent: Nov. 3, 2015

(54) METHOD FOR SEPARATING GAS IN A FLUIDIZED GAS/SOLID MIXTURE

(75) Inventors: Juan-David Llamas, Le Havre (FR); Patrick Leroy, Saint Vigor d'Ymonville (FR); Celine Derouin, Le Havre (FR); Nicolas Lenepveu, Fontenay (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 0 days.

(21) Appl. No.: 13/812,326

(22) PCT Filed: Aug. 12, 2011

(86) PCT No.: PCT/FR2011/051913
§ 371 (c)(1),
(2), (4) Date: Apr. 5, 2013

(87) PCT Pub. No.: WO2012/022910
PCT Pub. Date: Feb. 23, 2012

(65) Prior Publication Data
US 2013/0186273 A1    Jul. 25, 2013

(30) Foreign Application Priority Data
Aug. 20, 2010 (FR) .................... 10 56687

(51) Int. Cl.
| | |
|---|---|
| B01D 45/00 | (2006.01) |
| B01D 45/08 | (2006.01) |
| B01D 50/00 | (2006.01) |
| B01D 45/16 | (2006.01) |
| B01D 45/12 | (2006.01) |
| B01J 8/00 | (2006.01) |
| F01M 13/04 | (2006.01) |

(52) U.S. Cl.
CPC ............... *B01D 45/08* (2013.01); *B01D 45/12* (2013.01); *B01D 45/16* (2013.01); *B01D 50/002* (2013.01); *B01J 8/0065* (2013.01); *F01M 13/04* (2013.01)

(58) Field of Classification Search
CPC ...... B01D 45/08; B01D 50/002; B01D 45/16; B01D 45/12; F01M 13/04
USPC ............. 55/442–446, DIG. 37, DIG. 23, 462, 55/464–465; 95/272
See application file for complete search history.

(56) References Cited

U.S. PATENT DOCUMENTS

| | | | |
|---|---|---|---|
| 2,728,632 A | 12/1955 | Matheson | |
| 3,851,405 A | 12/1974 | Furukawa et al. | |
| 4,589,352 A | 5/1986 | Van Gasselt et al. | |
| 6,224,833 B1 * | 5/2001 | Rall | 422/143 |
| 2004/0226862 A1 * | 11/2004 | Meier et al. | 208/208 R |

OTHER PUBLICATIONS

International Search Report for PCT/FR2011/051913 dated Oct. 28, 2011.

* cited by examiner

*Primary Examiner* — Dung H Bui
(74) *Attorney, Agent, or Firm* — Sughrue Mion, PLLC

(57) ABSTRACT

Process for separating gases from a fluidized gas/solid mixture, comprising at least one injection of gas and optionally at least one injection of solids into and at least one discharge of solids from said fluidized bed, a discharge for gas from the mixture characterized in that it comprises a step of separating the solids entrained by the gas by means of an internal placed in that portion of the fluidized mixture where the voidage is greater than 0.7, occupying less than 10% of the free cross section of the bed.

15 Claims, 3 Drawing Sheets

METHOD FOR SEPARATING GAS IN A FLUIDIZED GAS/SOLID MIXTURE

CROSS REFERENCE TO RELATED APPLICATIONS

This is a National Stage of International Application No. PCT/FR2011/051913 filed Aug. 12, 2011, claiming priority based on French Patent Application No. 10 56687 filed Aug. 20, 2010, the contents of all of which are incorporated herein by reference in their entirety.

The present invention relates to a process for separating the gas from a gas/solid fluidized mixture, to the reactor for implementing this process and to the use of this process in an appropriate reactor for the industrial optimization of industrial conversion units for chemically active substances, in particular in fluid catalytic cracking (FCC) units.

For many years manufacturers have been preoccupied by separating the gas recovered at the outlet of a reactor containing a gas/solid fluidized mixture. Specifically, in such mixtures, the gas entrains solid particles and all the more so when the velocity of the gas is high. At the outlet of such mixtures, it is conventional to place efficient cyclone separators. However, these cyclones are rapidly worn when the quantity and/or velocity of the solid particles entrained by the gas is high, said particles having an abrasive effect on the internal wall of said cyclones.

It is commonly accepted that the lifetime of a cyclone in terms of erosion decreases both with the concentration of solids entrained by the gas and with the velocity of the latter. Therefore the lower the velocity of the gas and the concentration of solids, the longer the lifetime of the cyclone. By increasing the cyclone lifetime it is possible either to increase the flow rate of gas fed to the units, which do not suffer premature wear, or to reduce the number of stoppages of units suffering from recurrent wear problems. Such wear is found for example in units, or parts of units, containing fluidized mixtures, such as in FCC units, whether inside the upflow or downflow reactor, or inside the disengager, or inside the regenerator. Both rapid wear of cyclones and substantial loss of solids are found in industrial plants.

Many devices have been proposed for limiting the abrasion of these cyclones, the lifetime of which is thus shortened, and for limiting the loss of solids, which causes environmental problems and erodes the systems placed downstream, thereby further increasing the maintenance cost of the units employing these fluidized mixtures, or even incurring the additional cost of purchasing further catalyst.

All these devices are placed in a portion of the fluidized mixture where the bed is relatively dense. For example in the U.S. Pat. No. 2,687,343, an apparatus is placed at the interface between the dense phase and the dilute phase of the fluidized bed. This is an arrangement consisting of two curved concentric tubes in the form of rings, one placed inside the other, supporting a baffle, and also a thick grid forming ducts perpendicular to the walls of the reactor, the whole assembly being held fastened together. This arrangement can be moved over the entire height of the reactor.

In U.S. Pat. No. 3,851,405, bars or tubes are placed at fixed intervals, the function of these bars or tubes being to reduce the velocity of the particles that slide out of the fluidized mixture. The interval between each internal and its closest neighbour lies in the range from 0.005 to 0.3 times the height of the fluidized bed, and the ratio of the projected area of the set of internals to the cross-sectional area of the reactor is not smaller than 0.5.

In the patent EP 049 130, the device for reducing the number of particles entrained in the gas is an internal placed in a free zone of the reactor, the ratio of the projected area of which to the cross section of the reactor is not less than 0.8 and the ratio of the opening of which to the area of the unoccupied cross section of the reactor varies from 0.3 to 0.9. Such an internal is obtained by a combination of discs and rings, rotary bodies and/or an assembly of inclined plates so as to provide a downflow discharge of particles.

Such devices of the prior art slow down the particles entrained in a fluid but by occupying an excessively large flow area they increase the velocity of the gas streams and therefore increase the entrainment of the particles instead of limiting this. Furthermore, the flow restriction caused by such devices may lead to a pressure drop incompatible with proper operation of the units employing fluidized beds.

In U.S. Pat. No. 2,728,632, it has been proposed to place above said fluidized bed a single layer of deflectors which are parallel to one another, each deflector being at an angle alpha to the vertical at ranges from 1 to 30 degrees and of which the ratio of the width of each deflector to the distance (diameter) separating two deflectors is at least 4:1, preferably between 8:1 and 15:1. This arrangement of deflectors occupies the entire volume not occupied by the dense fluidized bed in the reactor. This arrangement can be applied both for gas/solid mixtures and for liquid/solid mixtures and would be applicable to the catalytic cracking process. However, the higher the ratio of the width of each deflector to the distance (diameter) separating two deflectors, the greater the volume occupied by the internal. In the case of a catalytic cracking process for example, this configuration would be incompatible with the presence of other equipment, such as cyclones, inside the tank. Moreover, an internal of such a size implies mechanical stresses linked, in particular, to the weight of the plates.

Other experts in fluidized beds have proposed the introduction, into the dense portion of a fluidized bed, of internals for separating the bed into distinct streams, allowing better contact between the downwardly flowing solids and the countercurrent of the injected gas, as described in patent application WO 00/035575.

The Applicant has therefore chosen to recommend a process for separating particles from the gas discharged from a fluidized bed, which consists in covering the largest possible cross-sectional area of the reactor by means of an internal for the purpose of folding the maximum amount of particles back towards the bed, while limiting the area occupied by said internal at all levels of said reactor in order to obtain the highest possible flow area and while limiting the volume it occupies inside said reactor.

In the context of the present description, the term "cross section of the reactor" is understood to mean the plane cutting the axis of said reactor perpendicularly. The free cross section of the reactor is the flow area left free in the plane of the cross section of said reactor, excluding the internal equipment (cyclones, tubular ducts or other conventional devices).

One subject of the present invention is therefore a process for separating gases from a fluidized gas/solid mixture, contained in a reactor, comprising at least one injection of gas into and at least one discharge of gas from said fluidized mixture, and optionally at least one injection of solids into and at least one discharge of solids from said fluidized mixture, characterized in that it comprises a step of separating the solids entrained by the gas by means of an internal placed parallel to the cross section of the reactor in that portion of the fluidized mixture where the voidage is greater than 0.7, the cross section of this internal parallel to the plane of the free cross section of said reactor occupying less than 10% of the free cross section of the reactor, and in that the internal comprises at least one unitary internal which comprises at least two layers of deflectors.

The term "solids" is understood to mean any type of material used in fluidized mixtures, but advantageously these will refer to solid particles on account of the usual size of the solids used in fluidized mixtures.

Advantageously, the deflectors of one and the same layer of said at least one unitary internal are inclined in the opposite direction to the deflectors of the adjacent layer.

The term "angles in opposite directions" is understood to mean angles of which one is acute and the other obtuse, relative to the cross section of the reactor.

In the context of the present invention, when the internal occupies less than 10% of the free cross section of the reactor, this means that the area occupied by the cross section of the internal parallel to or superposed on the free cross section of the reactor corresponds to less than 10% of the area of said free cross section. Thus, contrary to other systems of the prior art, such as that of document U.S. Pat. No. 4,589,352, there is not solid retention volume under the internal.

The voidage of a fluidized mixture is defined as the ratio of the volume of gas to the total volume of the fluidized mixture. A dense phase of the fluidized mixture is therefore defined as being that in which the voidage is less than 0.7, that is to say when the volume of the gas is less than 70% of the volume of the fluidized mixture. The dilute phase is defined as that in which the voidage is greater than 0.7, that is to say when the volume of the gas is greater than 70% of the volume of the fluidized mixture.

To calculate the voidage of a fluidized mixture, the density of the constituents of said fluidized mixture can only be approximated. It is known that the voidage, or its corollary the density, of a fluidized mixture is not uniform over its entire height and/or its width in a reactor, and in particular it varies very greatly between the lower portion and the upper portion of said reactor. The voidage may be calculated from the density of the gas present in the fluidized mixture ($D_g$), from the density of the solids used ($D_s$) and from the density of the fluidized mixture ($D_m$).

This voidage is calculated from the following equation (I):

$$\text{Voidage} = (D_s - D_m)/(D_s - D_g) \tag{I}$$

The densities of the solid and gas mixture contained in the fluidized mixture may be measured and/or calculated by techniques known per se by those skilled in the art.

The density of the fluidized mixture is obtained for example by measuring the pressure drop by means of pressure sensors placed at two levels in said mixture, assuming that a fluidized mixture behaves as a liquid (see the description on page 5 of the work entitled "Fluidized Engineering" by Daizo Kunii and Octave Levenspiel, 2nd Edition, 1991). Since the pressure drop measured between these two points in the fluidized mixture is equal, according to equation (II) below:

$$DP = D_m g H \tag{II}$$

to the product of the fluidized mixture density $D_m$, the gravitational acceleration g and the distance H separating these two points, we can easily recalculate $D_m$.

In one particular embodiment of the invention, if the fluidized mixture contains a solid having a bulk density of around 1350 kg/m$^3$ in a gas mixture containing more than 70% nitrogen at a pressure close to 2 bar and at a temperature of around 750° C., the internal according to the invention will preferably be positioned in that portion of the fluidized bed where the voidage is greater than 0.7 and the density is less than 400 kg/m$^3$.

Among the advantages of the present invention, one is related to the internal, which reduces the gas flow area only very slightly compared to the cross section of the reactor at all levels and induces only a very small pressure drop. Consequently, there is no or little increase in the velocity of the gas and no additional particle entrainment caused by the presence of this internal is observed. In addition, the fact of using at least two layers of deflectors inclined in opposite directions with respect to the cross section of the reactor from one layer to the other makes it possible to reduce the volume occupied by the internal inside the reactor. The proposed internal acts as a compact ballistic separator which reduces the kinetic energy of the solid particles which are entrained by the gas.

Another advantage of the invention is also the ability to place the internal at any level in the dilute phase without running the risk of entraining solid particles by increasing the flow velocity of the gas upon passing through the internal.

Another advantage associated with the reduction in solid particle entrainment beyond the internal is the slight densification of the dilute phase lying beneath said internal, thus making it possible, when the reaction involved is exothermic, better dissipation of the heat released by the reaction and therefore better control of the side reactions that are liable to occur. For example, for a combustion reaction such as in FCC catalyst regeneration processes, there is better dissipation of the heat generated by the combustion of carbon monoxide owing to the presence of a densified solid particle phase and therefore a reduction in temperature deviations caused by post-combustion.

It is also possible to increase the lifetime of cyclones in units suffering erosion and to reduce the shut-down periods for repairing the units and consequently the costs associated with the loss of production and costs of replacing devices.

Finally, the throughput in the unit may be increased without running the risk of prematurely stopping the units due to cyclone erosion.

The present invention relates in particular to the use in the process of an internal the ratio of the projected area of which to the free cross-sectional area of the reactor is greater than 0.75. The free cross section of the reactor is, in an industrial reactor, the area not occupied by other equipment, such as cyclones, tubular ducts or any other conventional device, that is to say the flow area left free in the plane of the cross section of said reactor.

In the process as claimed, the internal limits the entrainment of the solids and does not increase the velocity of the gas passing through it by more than 10%.

Furthermore, advantageously the internal is configured so as to occupy less than 5% of the free cross section of the reactor and so that the ratio of the projected area of the internal to the free cross-sectional area of the reactor varies from 0.8 to 1. Thus, a projection of the internal onto 100% of the free cross section of the reactor is considered to be the optimum achieved for the invention, most particularly when the internal occupies much less than 5% of the free cross-sectional area of the reactor.

Another subject of the invention is a reactor designed to contain the fluidized mixture and comprising gas and solid inlet ducts, at least one gas discharge duct and at least one solid discharge duct, characterized in that it comprises an internal occupying at most 10% of said free cross-sectional area of the reactor, the area of which, projected onto said free cross section of the reactor, corresponding to more than 75% of said free cross-sectional area of the reactor, and said internal being placed in a portion of said reactor where the voidage of the fluidized mixture is less than 0.7.

To fulfil its function of turning solid particles back down into the fluidized bed the internal advantageously comprises means designed to deflect the solids towards the bottom of said reactor.

According to the invention this internal comprises at least one unitary internal and preferably at least two unitary internals, each unitary internal comprising at least two layers of deflectors, said deflectors of the second layer being inclined with respect to the cross section of said reactor in the opposite direction to those of the first layer. In practice, for large areas, the internal will comprise several unitary internals inside the reactor. Specifically, to produce the internal on an industrial scale, the internal would be formed so as to cover all or part of the free cross section of the reactor by the juxtaposition of unitary internals for achieving the characteristics of the internal according to the invention. In this embodiment, the deflectors of any one layer are not necessarily always mutually parallel, since an industrial internal may consist of several unitary internals.

Preferably, each unitary internal comprises at least two layers of deflectors placed parallel to one another along one and the same layer and held fastened together, by any means known to those skilled in the art. The distances $E_i$ separating two deflectors of one and the same layer may be identical or different.

In one particular embodiment of the invention, the lower edges of the deflectors of one layer and the upper edges of the deflectors of the layer placed immediately therebelow make an angle $\alpha$ that varies from 0 to 90 degrees. Preferably, the angle $\alpha$ is chosen to be equal to 0 degrees or to 90 degrees.

When the angle $\alpha$ is equal to zero, from one layer to another, the deflectors are arranged in such a way that the lower edges of the deflectors of one layer are placed at a distance d from the upper edges of the deflectors of the layer placed immediately therebelow, d varying from 0 to $E_i$. In a preferred embodiment, all the spacings $E_i$ are identical and d is equal to $E_i/2$.

In one and the same layer, each deflector consists of at least one plate making an angle $\theta$ with the cross section of said reactor in such a way that sine is equal to the ratio of the thickness h of a layer to the width L of said plate.

Preferably, $E_i$ is chosen as less than or equal to the product of L multiplied by the cosine of the angle $\theta$, in order to guarantee that all of the gas-solid stream passing through a unitary internal comes into contact with the deflectors. In the layers of a same unitary internal, the widths L of the plates of the deflectors may vary from one layer to another.

Preferably, the angle $\theta$ is chosen as varying from 10 to 90 degrees, even from 10 to 60 degrees, to the cross section of said reactor.

More preferably, the angle $\theta$ is chosen as varying from 30 to 60 degrees to the cross section of said reactor for each layer of deflectors.

The angles $\theta_1$ and $\theta_2$ of the deflectors in two successive layers $C_1$ and $C_2$ are different with respect to the cross section of the reactor, one being acute, the other obtuse so as to obtain inclinations in opposite directions. In a preferred embodiment, $\theta_2$ is equal to $\theta_1+90$ or $180-\theta_1$ degrees.

In a preferred embodiment of the invention, the unitary internal comprises at least three layers of deflectors making an angle $\theta_i$ to the cross section of said reactor, and a fourth layer, called rectifying layer, placed above the first three layers, comprising deflectors perpendicular to the cross section of said reactor. Said fourth layer makes the gas streams flow uniformly after having passed through the first three layers, and the width L of the deflectors of said fourth layer being generally chosen to be smaller than those of the deflectors of the layers located upstream thereof. In this configuration, the angles $\theta_i$ are chosen such that the deflectors of the first and of the third layers are inclined in the same direction, and those of the second layer in the opposite direction to the aforementioned.

It would not be outside the scope of the invention if each deflector were to consist of at least two fins as a replacement for said plate, said fins preferably have the same widths and make a pairwise angle that varies from 0 to 90 degrees. The use of a plurality of fins arranged next to one another and making an angle to one another ranging from 0 to 90 degrees would make it possible to further reduce the volume occupied by the internal in said reactor, it being possible for two layers to intersect one another. This is the case of internals as described in WO 00/35575. A final subject of the invention is the use of said process in a reactor equipped with an internal as described above for the gas/solid separation in a fluidized catalytic bed, more particularly for the gas/solid separation in the fluidized bed of a regenerator of a catalytic cracking unit and/or of the disengager/stripper at the outlet of the reactor, in the least dense portion of the gas/solid mixture.

In this particular embodiment of the invention, the internal will advantageously be placed in the regenerator at a level in the fluidized bed where the density is less than 400 kg/m$^3$.

The present invention will now be described in light of the figures and examples given hereinbelow.

FIG. 1 shows two layers of an internal, each of the deflectors $D_i$ and $D_j$ of which makes an angle $\theta=45°$ to the horizontal and the lower edges of the deflectors $D_i$ and the upper edges of the deflectors $D_j$ make an angle $\alpha$ of 90°.

Two adjacent deflectors of any one layer are separated by a distance $E_i$.

FIG. 2 shows the preferred arrangement of the invention. The internal is a complete (unitary) internal having four layers, namely three layers of deflectors and one rectifying layer. The angle $\theta$ is 45° and the angle $\alpha$ is equal to 0°. FIG. 2a corresponds to a top view of the internal, here consisting of a single unitary internal. FIG. 2b corresponds to a vertical cross section of the internal in a plane along the height of the reactor perpendicular to the plane of FIG. 2a above. The angles and the distances mentioned in the present description are indicated therein. FIG. 2c shows a vertical cross section along the height of the reactor perpendicular to that shown in FIG. 2b, in which the number of layers and the height of each of them may be seen.

Figure 1:
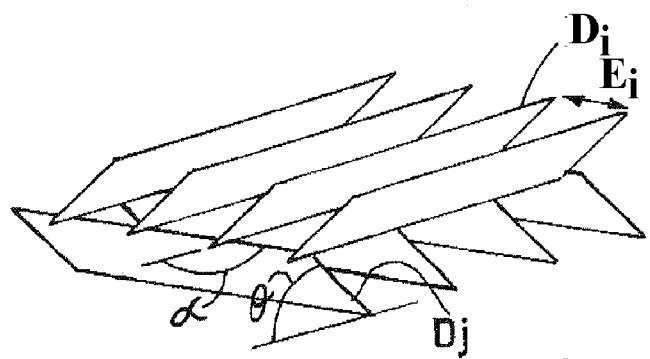
Figure 2A:
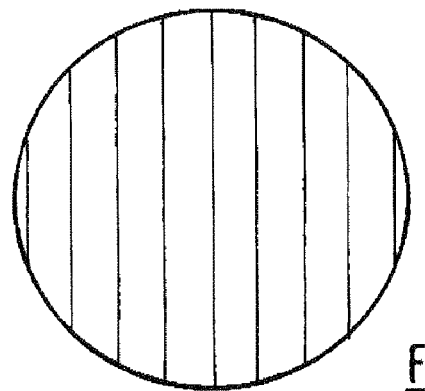
Figure 2B:
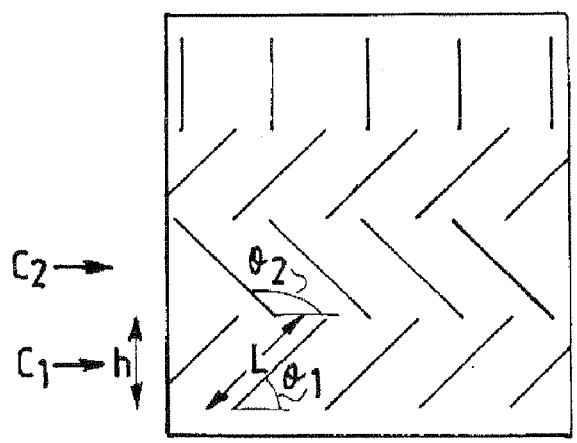
Figure 2C:
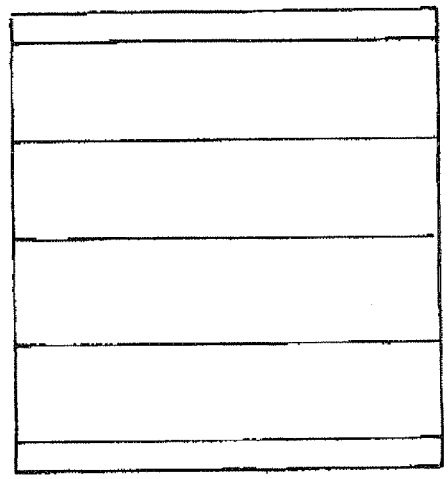
Figure 3:
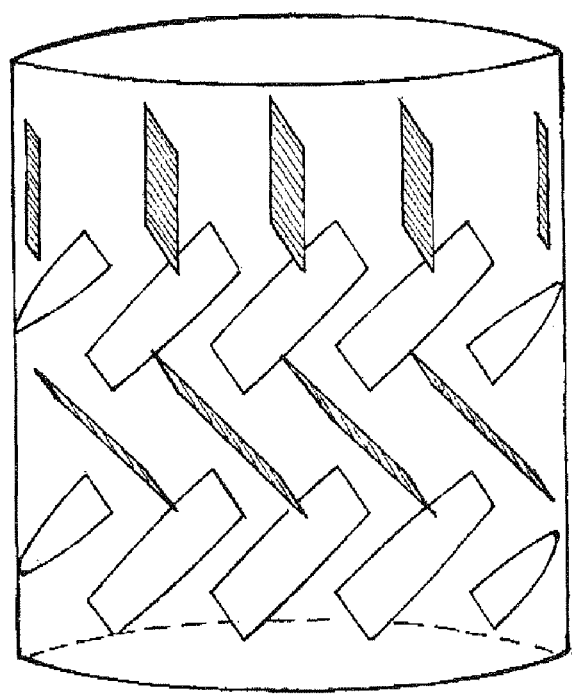
FIG. 3 shows, in a spatial representation, a cylindrical element depicting a tank containing an internal having four layers, namely three deflector layers and one rectifying layer.
Figure 4:
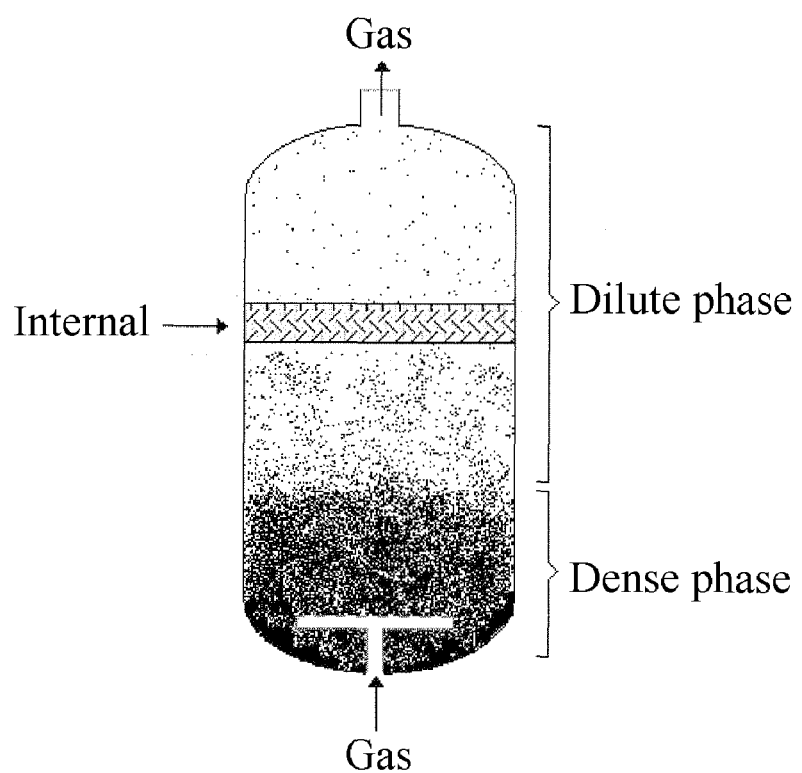
FIG. 4 shows the reactor according to the invention, in which the internal is placed within the dilute phase of said reactor.

In the rest of the present description, examples are given by way of illustration of the present invention but these are not limiting.

EXAMPLE I

This example describes the variation in the mass of entrained particles for a gas surface velocity of 0.8 m/s when the ratio $P_s$ of the projected area of the internal to the cross section of the reactor goes from 0.5 to 1. In this example, the unitary internal was proportioned for its use in a laboratory reactor.

The reactor in which the internal is placed measures 0.34 m in diameter. Under the conditions for use of the reactor, the diluted phase has a height of 3.5 m.

The internal is composed of three layers, the angle alpha between two successive layers being equal to 0.

The first and third layers each comprise 4 deflectors, the second layer comprises only 3 thereof owing to geometric constraints and in order to avoid any baffle blocking the circulation of the gases and solids.

In a lower layer, the angle θ of inclination of the plates is 45 degrees. In the layer immediately above, this angle θ is 135 degrees, and in the third layer, the angle θ is again equal to 45 degrees.

The distance $E_i$ between the deflectors is 0.07 meter.

The width L of the plates constituting the deflectors is 0.1 meter.

The distance "d" between the upper edges of the deflectors of the first layer and the lower edges of the deflectors of the second layer is fixed at E/2, i.e. 0.035 m.

The thickness of each layer is 0.07 m, i.e. the result of the product of the width "L" of the deflectors multiplied by the sine of the angle θ.

The height throughout the internal thus designed is 0.21 m, i.e. approximately 6% of the total height of the diluted phase of the reactor. For this internal, the projected area of the internal to the cross section of the reactor, Ps, is 1.

In order to obtain Ps values of 0.75 and 0.5 as described in Table 1 hereinbelow, respectively 1, and then 2 deflectors are withdrawn per layer.

TABLE 1

| $P_s$ | Mass of entrained particles (%) |
|---|---|
| No internal | 100 |
| 0.5 | 71 |
| 0.75 | 54 |
| 1.00 | 32 |

It may be seen that the higher the ratio ($P_s$) of the projected area of the internal to the cross section of the reactor, the lower the mass of gas-entrained particles.

EXAMPLE II

This example describes the variation of the mass of entrained particles for a surface gas velocity of 0.8 m/s in the case of internals having two or three layers ($N_c$) of deflectors. In this case, the ratio ($P_s$) of the projected area of the internal on the cross section of the reactor is 1. The layers of detectors are oriented in the preferred configuration of the invention with $\theta_1=45°$, $\theta_2=\theta_1+90°$ and $\alpha=0°$ for $N_c=2$ and $\theta_1=45°$, $\theta_2=\theta_1+90°$, $\theta_3=\theta_1$ and $\alpha=0°$ for $N_c=3$.

L is chosen as equal to 0.28 m, therefore the distance between two plates is $E_i$ less than or equal to 0.198 m and the height h of each layer is equal to 0.198 m.

TABLE 2

| Nc | Mass of entrained particles (%) |
|---|---|
| No internal | 100 |
| 1 | 75 |
| 2 | 58 |
| 3 | 32 |

It may be seen that the higher the number of layers equipped with deflectors, the lower the mass of gas-entrained particles.

The invention claimed is:

1. A process for separating gases from a fluidized gas/solid mixture contained in a reactor, characterized in that the process comprises at least one step of injecting gas and at least one step of discharging gas, and optionally at least one step of injecting solids and at least one step of discharging solids, and further comprises a step of separating the solids entrained by the gas by passing the fluidized gas/solid mixture along an internal placed parallel to a free cross-sectional area of the reactor in a portion of the fluidized gas/solid mixture where a voidage is greater than 0.7, a cross section of the internal occupying less than 10% of the free cross-sectional area of the reactor and the internal comprising at least one unitary internal which comprises at least a first layer and a second layer of deflectors, and a ratio of a projected surface area of the internal to the free cross-sectional area of the reactor is greater than 0.75, wherein each of the deflectors comprises at least one plate, and wherein each of the first and second layers of deflectors comprises a plurality of deflectors such that the deflectors of the first layer are inclined in an opposite direction to the deflectors of the second layer, and wherein a lower edge of each of the plurality of deflectors of the first layer is immediately above an upper edge of each of the plurality of deflectors of the second layer.

2. The process according to claim 1, characterized in that said internal is configured to limit an entrainment of the solids and not to increase a velocity of the gas passing through it by more than 10%.

3. The process according to claim 1, characterized in that the internal occupies less than 5% of the free cross-sectional area of the reactor and the ratio of the projected surface area of the internal to the free cross-sectional area of the reactor varies from 0.8 to 1.

4. The process according to claim 1 carried out in a reactor for gas/solid separation in a fluidized catalytic bed, the reactor designed to contain the fluidized mixture and comprising gas and solid inlet ducts, at least one gas discharge duct and at least one solid discharge duct, an internal placed parallel to the free cross-sectional area of the reactor and occupying at most 10% of the free cross-sectional area of the reactor, and an area of the internal projected onto said free cross-sectional area of the reactor corresponds to more than 75% of said free cross-sectional area, the internal being placed in a portion of said reactor where the voidage is greater than 0.7, and in that said internal comprises at least one unitary internal which comprises at least two layers of deflectors, wherein each of the deflectors comprises at least one plate, and wherein each of the first and second layers of deflectors comprises a plurality of deflectors such that the deflectors of the first layer are inclined in an opposite direction to the deflectors of the second layer, and wherein a lower edge of each of the plurality of deflectors of the first layer is immediately above an upper edge of each of the plurality of deflectors of the second layer.

5. The process according to claim 4, wherein gas/solid separation occurs in the fluidized bed of a regenerator of a catalytic cracking unit and/or of a disengager/stripper at an outlet of the reactor, in a least dense portion of the gas/solid mixture.

6. A reactor for implementing the process according to claim 1, wherein the reactor is designed to contain the fluidized mixture, and comprises gas and solid inlet ducts, at least one gas discharge duct and at least one solid discharge duct, an internal parallel to and occupying at most 10% of said free cross-sectional area of the reactor, a surface area of the internal projected onto said free cross-sectional area of the reactor corresponds to more than 75% of said free cross-sectional area, and the internal being placed in a portion of said reactor where the voidage is greater than 0.7, and the internal comprises at least one unitary internal which comprises at least a first layer and a second layer of deflectors, wherein each of the deflectors comprises at least one plate, and wherein each of the first and second layers of deflectors comprises a plurality of deflectors such that the deflectors of the first layer are inclined in an opposite direction to the deflectors of the second layer, and wherein a lower edge of each of the plurality of deflectors of the first layer is immediately above an upper edge of each of the plurality of deflectors of the second layer.

7. The reactor according to claim 6, characterized in that the lower edges of each of the deflectors of the first layer and the upper edges of each of the deflectors of the second layer placed immediately therebelow make an angle $\alpha$ that varies from 0 to 90 degrees.

8. The reactor according to claim 7, characterized in that when the angle $\alpha$ is 0, the lower edges of the deflectors of the first layer are placed at a distance d from the upper edges of the deflectors of the second layer, d varying from 0 to $E_i$.

9. The reactor according to claim 6, characterized in that each of the plates in the first layer $C_1$ makes an angle $\theta_1$ with the free cross-sectional area of the reactor, and each of the plates in the second layer $C_2$ makes an angle $\theta_2$ with the free cross-sectional area of the reactor, wherein the first and second layers are successive layers and are identical or different, and wherein $\theta_2$ is equal to $\theta_1+90$ or $180-\theta_1$ degrees.

10. The reactor according to claim 6, characterized in that the at least one unitary internal comprises at least three layers of deflectors making an angle $\theta_i$ to the free cross-sectional area of said reactor, and a rectifying layer comprising deflectors perpendicular to the free cross-sectional area of the reactor placed above the at least three layers of deflectors.

11. The reactor according to claim 6, characterized in that the at least one plate makes an angle $\theta$ with the free cross-sectional area of the reactor such that sin $\theta$ is equal to a ratio of a thickness h of a single layer of deflectors to a width L of the plate.

12. The reactor according to claim 11, characterized in that the at least one plate comprises at least two fins, the two fins having same widths and making a pairwise angle that varies from 0 to 90 degrees.

13. The reactor according to claim 11, characterized in that the angle $\theta$ varies from 10 to 90 degrees.

14. The reactor according to claim 13, characterized in that the angle $\theta$ varies from 10 to 60 degrees.

15. The reactor according to claim 13, characterized in that the angle $\theta$ varies from 30 to 60 degrees.

* * * * *